July 30, 1968   W. K. PRIESE   3,394,632
VALVE ACTUATOR
Filed June 24, 1966   3 Sheets-Sheet 1
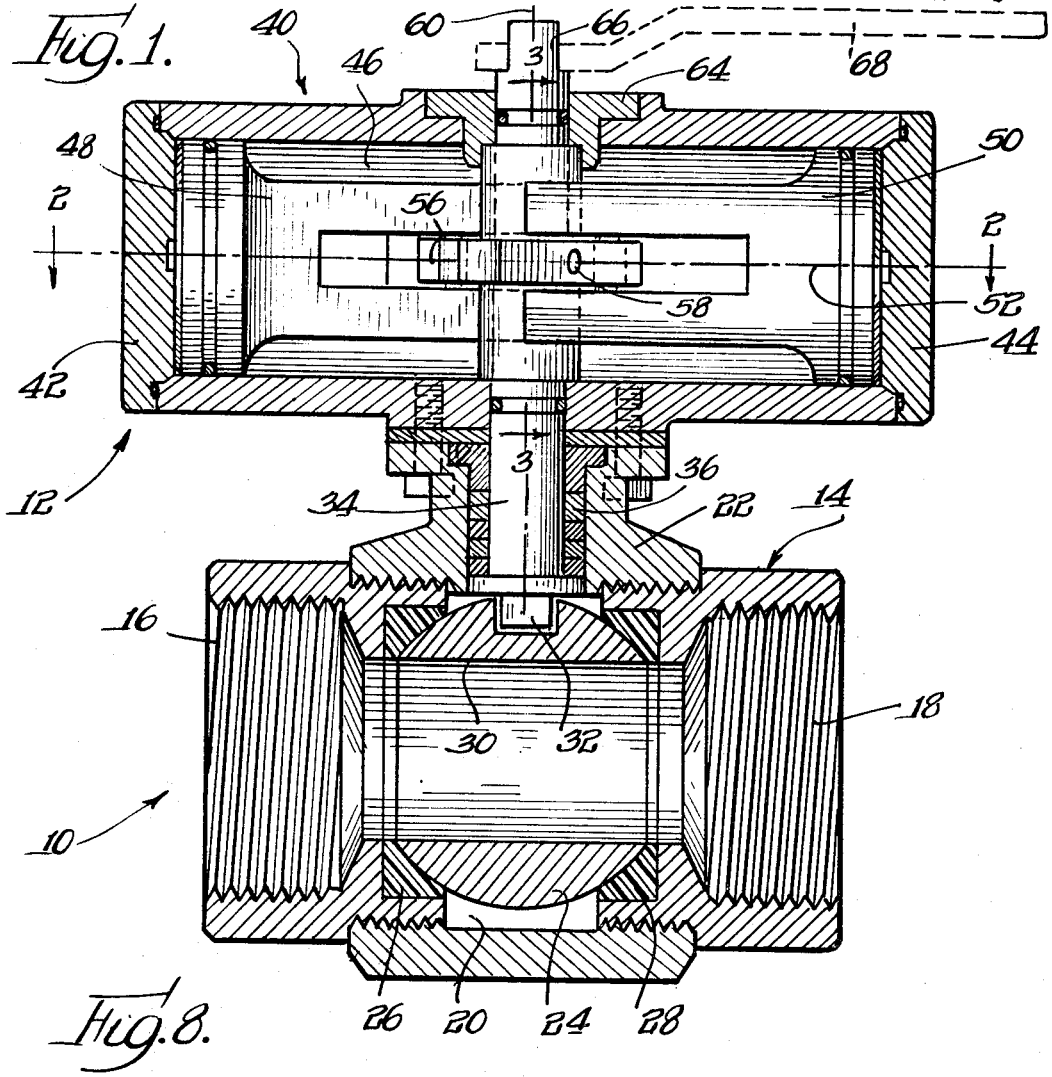
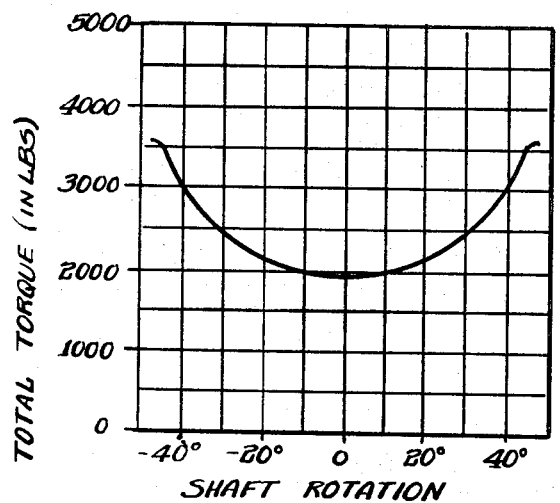
Inventor
Werner K. Priese
By: Olson, Trexler
Wolters & Bushnell
attys

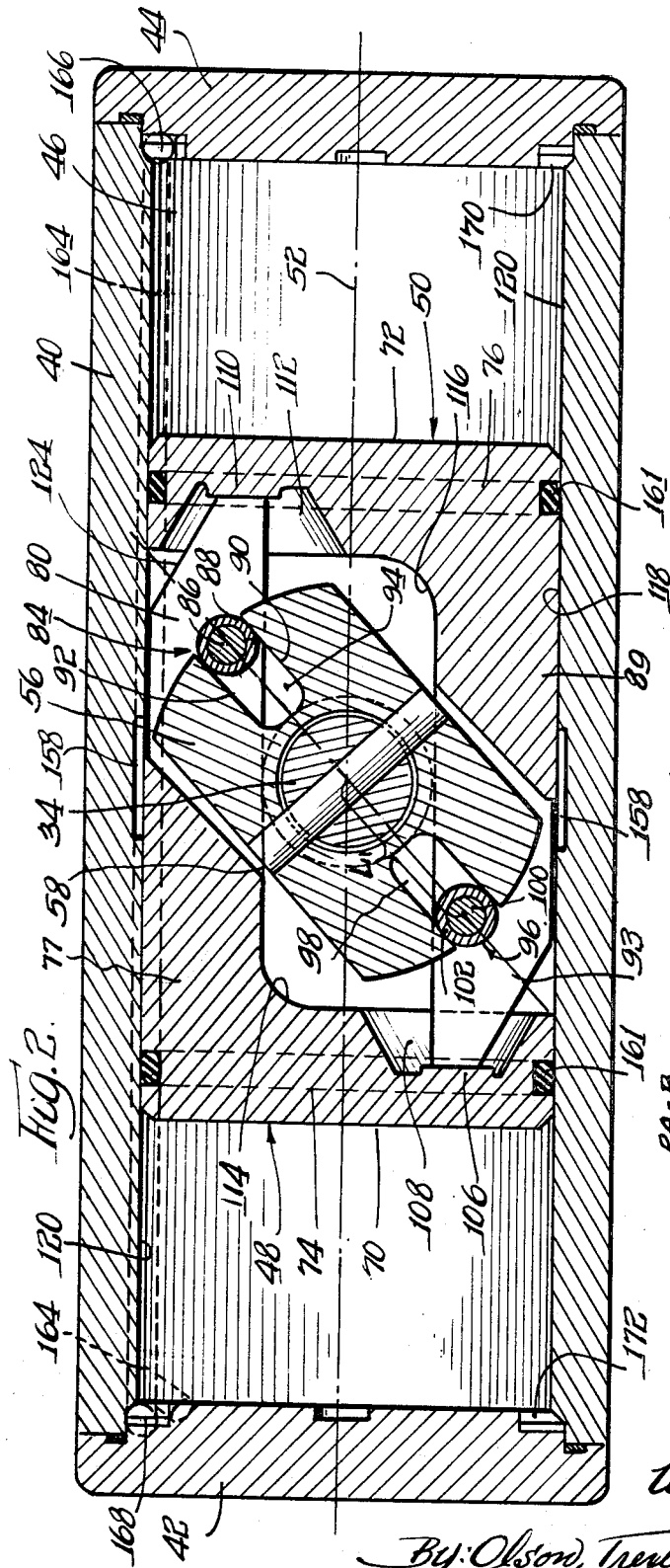

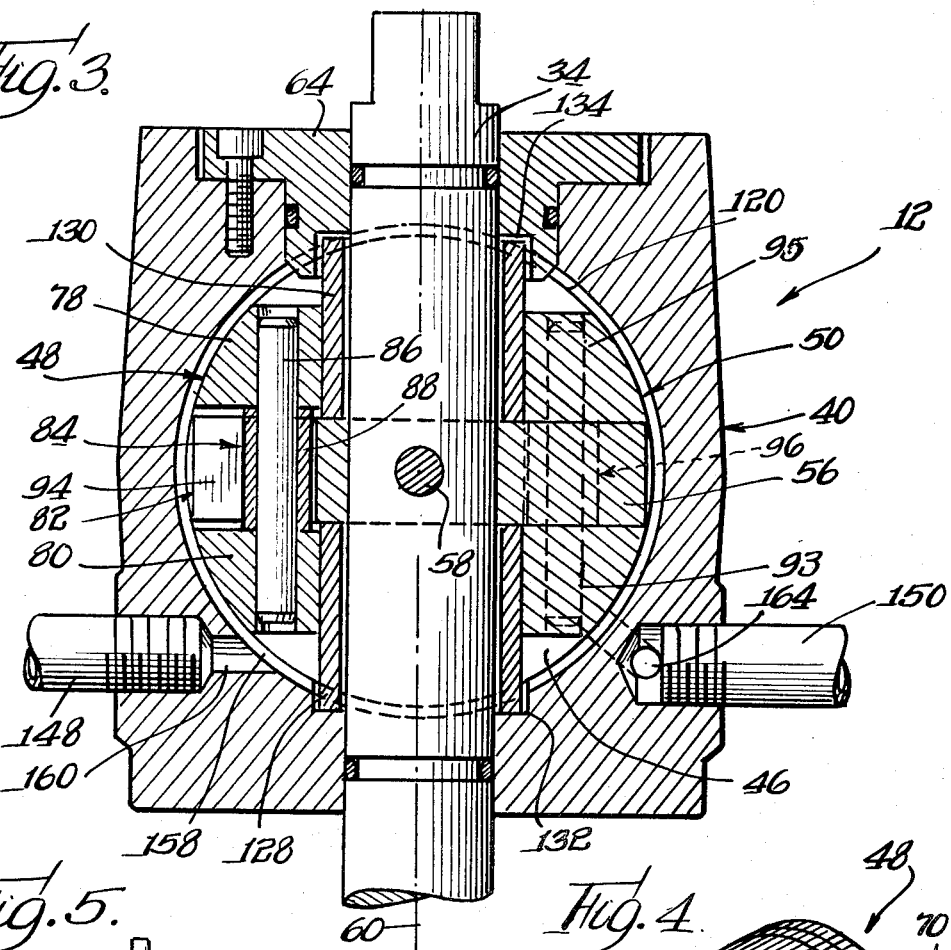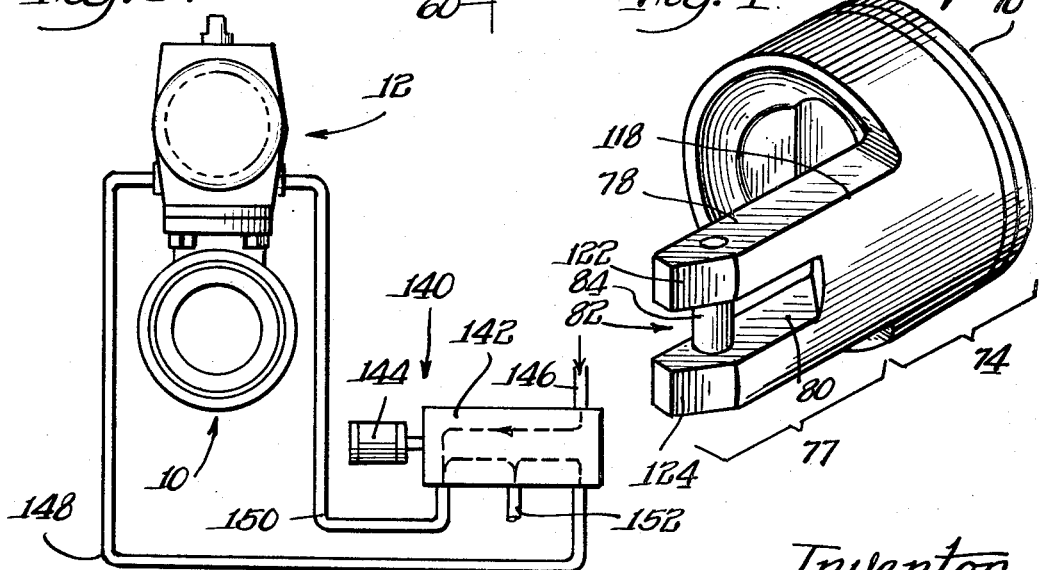

United States Patent Office 3,394,632
Patented July 30, 1968

3,394,632
VALVE ACTUATOR
Werner K. Priese, Barrington, Ill., assignor to Hills-McCanna Company, Carpentersville, Ill., a corporation of Illinois
Filed June 24, 1966, Ser. No. 560,216
5 Claims. (Cl. 92—68)

ABSTRACT OF THE DISCLOSURE

A valve actuator assembly including a housing having a control shaft mounted therein, a pair of pistons mounted for reciprocating movement within the housing, each of the pistons having a longitudinally extending leg with a pin connected thereto. The pins of the legs slidably engage a lever means connected to the control shaft so that upon the movement of the pistons by means of hydraulic fluid brought into the housing, the control shaft is rotated to in turn open or close a valve connected to the assembly. A cylindrical guide wall mounted for rotation coaxially about the control shaft engages the respective legs of the pistons to prevent side thrust forces exerted by the pistons from disturbing the positioning of the control shaft and to reduce wear on the side walls of the housing.

This invention relates generally to a valve actuator and more particularly to a valve actuator for applying a high initial torque to a control mechanism for a valve.

In many valves it is necessary to apply a relatively large initial torque to a valve control shaft to operate the valve. This relatively large initial torque is necessary to overcome the inertia of a valve control mechanism and to break a seal between a flow control member and valve seats. Once the seal between the flow control member and the valve seats has been broken by an initial movement of the valve control mechanism, the torque required to complete the operation of the valve control mechanism is substantially reduced. Thus, when a valve is operated a large initial torque is required, while after the initial actuation of the valve a lower amount of torque is required to complete the operation of the value.

Fluid type valve actuators are commonly utilized for selectively operating a valve. These actuators usually include a control shaft which is rotated by a pair of rack type gears, in a manner similar to that set forth in my prior Patent No. 3,107,080. These gear operated prior art valve actuators are very satisfactory for many purposes, as shown by their widespread industrial usage. However, these prior art valve actuators apply a constant torque to the gear driven control shaft. Thus, the actuator must be large enough to meet the relatively high initial torque requirements for operating a valve.

Therefore, it is the object of this invention to provide a compact valve actuator for applying a high initial torque to a valve operating mechanism.

Other objects and features of the invention will become more apparent upon a reading of the following detailed description taken in connection with the accompanying drawings wherein:

FIG. 1 is a sectional view of a valve assembly on which an actuator forming a preferred embodiment of the invention is mounted;

FIG. 2 is an enlarged sectional view of the valve actuator, taken along the line 2—2 of FIG. 1, illustrating the relationship between a pair of relatively movable pistons and a lever for operating the valve.

FIG. 3 is an enlarged sectional view of the actuator, taken along the line 3—3 of FIG. 1, illustrating the vertical relationship between the pistons, lever and a shaft for operating the valve of FIG. 1;

FIG. 4 is a perspective view illustrating a piston used in the actuator of FIG. 1;

FIG. 5 is a schematic illustration of the control system of the valve actuator of FIG. 1;

FIG. 6 is a force diagram illustrating the application of force to the operating lever of FIG. 2 by a piston;

FIG. 7 is a force diagram illustrating the relationship between the force components of FIG. 6; and FIG. 8 is an illustrative graph of the torque applied to the valve operating shaft by the operating lever as a function of the rotation of the operating shaft.

Referring now to the drawings in greater detail, there is shown in FIG. 1 a valve assembly 10 which is operated by a valve actuator 12 which forms a preferred embodiment of my invention. The valve 10 includes a housing 14 to which two conduits may be connected at the passages 16 and 18 at opposite ends of the valve 10. A valve chamber 20 is defined by the housing 14 and a valve bonnet 22. A flow control member or valve ball 24 is mounted within the valve chamber 20 in sliding engagement with valve seats 26 and 28. The valve seats are positioned on opposite sides of the valve ball to seal the joint between the valve ball and the valve housing. The valve 10 is operated, in a well known manner, by rotating the valve ball 24 in the valve chamber 20 to control the flow of fluid through the passages 16 and 18.

The valve ball advantageously includes a rectangular socket 30 in which an end tang or extension 32 of a control or drive shaft 34 is positioned. The control or drive shaft 34 is rotated by the valve actuator 12 to selectively rotate the valve ball 24 and control the flow of fluid through the valve 10. A suitable packing 36 is provided between the control shaft 34 and the bonnet 22 to prevent fluid leakage.

The valve actuator 12 includes a generally cylindrical outer housing 40 to which a pair of cylinder heads or caps 42 and 44 are connected to define a cylindrical piston chamber 46. A pair of pistons 48 and 50 are mounted for reciprocating movement along a longitudinal axis 52 of the housing 40 and chamber 46.

A yoke plate or lever 56 is secured to the control shaft 34 by a yoke pin 58 so that the center of the yoke plate or lever 56 coincides with an intersection between the longitudinal axis 52 of the housing 40 and a longitudinal axis 60 of the control shaft 34. The yoke plate or lever 56 and control shaft 34 are rotated relative to the housing 40 by reciprocating movement of the pistons 48 and 50 to operate the valve 10. This rotation of the control shaft 34 is facilitated by a bearing cap 64 which is mounted in an upper portion of the housing 40. The upper end of the control shaft 34 is advantageously provided with a tang 66 to which a hand tool 68 can be connected to rotate the control shaft 34 manually.

Referring now to FIG. 2 taken in conjunction with FIGS. 3 and 4, it will be seen that the pistons 48 and 50 are movable inwardly from the extended position shown in FIG. 1. This movement of the pistons 48 and 50 results from the application of fluid pressure against an outer surface 70 and 72 of head portions 74 and 76 of the pistons 48 and 50. As is perhaps best seen in FIG. 4, the head portion 74 of the piston 48 is generally cylindrical in shape and is integrally formed with a side wall section 77 which extends longitudinally from the head portion 74 of the piston. The side wall section 77 includes a pair of longitudinally extending legs 78 and 80 which are spaced apart to define an aperture or slot 82 in which a pin assembly 84 is mounted.

As is seen in FIGS. 2 and 3, the pin assembly 84 includes a central pin member or rod 86 fixedly mounted in the spaced apart legs 78 and 80. A cylindrical roller 88 is mounted coaxially with the pin member 86 between the longitudinally extending legs 78 and 80. The roller 88 is in rolling engagement with side walls 90 and 92 (see FIG. 2) of a generally U-shaped slot 94 formed in the yoke plate or lever 56. The yoke plate or lever 56 extends into the slot 82 formed between the legs 78 and 80 of the piston 48 to engage the roller 88.

The piston 50, as shown in FIG. 2, is substantially identical in structure to the piston 48 and includes a side wall portion 89 which is formed integrally with the head portion 76. A pair of spaced apart leg members 93 and 95 (see FIG. 3) are provided for mounting a pin assembly 96. The pin assembly 96 engages the generally U-shaped slot 98 in an opposite end portion of the yoke lever 86 in much the same manner as the pin assembly 84 engages the generally U-shaped slot 94 in the loke lever 56. The pin assembly 96 includes a pin member 100 and a generally cylindrical roller 102.

When the pistons 48 and 50 are moved from the outwardly extending position of FIG. 1 to the inner position of FIG. 2, by the application of fluid pressure to the outer surfaces 70 and 72, the pin assemblies 84 and 96 press against the outwardly extending side walls of the generally U-shaped apertures 94 and 98 to rotate the yoke plate or lever 56 and the control shaft 34 for approximately ninety degrees to operates the valve 10. The inward movement of the piston 50 is limited by engagement of the longitudinally extending legs 93 and 95 with a raised boss 106 which is formed in a recess 108 in the head portion 74 of the piston 48. In a similar manner, the inward movement of the piston 48 is limited by the engagement of the longitudinally extending legs 78 and 80 with a raised boss 110 formed in a recess 112 in the head portion 76 of the piston 50. The outward movement of the pistons 48 and 50, from the position shown in FIG. 2 to the position shown in FIG. 1, is caused by the application of fluid pressure against an inner surface 114 of the piston 48 and 116 of the piston 50. The outward movement of the pistons 48 and 50 is limited by the engagement of the head portions 74 and 76 of the pistons with the end caps 42 and 44 of the housing 40 (see FIG. 1).

The legs 78 and 80 of the piston 48 have a generally arcuate outer surface 118 (see FIGS. 2 and 4) which is positioned in sliding engagement with an inner cylindrical wall 120 of the chamber 46. The outermost ends of the legs 78 and 80 are tapered inwardly, away from the wall 120, to form inwardly sloping surfaces 122 and 124 which enable the legs 78 and 80 to engage the boss 110 in a recess 112 of the piston 50. As is perhaps best seen in FIG. 2, the boss 110 is spaced apart from the side wall 120 of the chamber 46 to enable the head portion 76 of the piston 50 to be maintained in sealing engagement with the cylindrical side wall 120 and to maximize the relative travel between the pistons 48 and 50 by the provision of a recess 112 in the head portion of the piston 50. In a similar manner, the leg sections 93 and 95 of the piston 50 are also tapered inwardly to engage the boss 106 at an area spaced inwardly from the sidewall 120 of the chamber 46.

Referring now to FIG. 3, the skirt or sidewalls 77 and 90 (FIG. 2) of the pistons 48 and 50 are maintained in sliding engagement with the cylindrical wall 120 of the chamber 46 by a pair of cylindrical guide walls 128 and 130. The cylindrical guide wall 128 is positioned coaxially with the control shaft 34 between a lower surface of the yoke lever 56 and the housing 40. A cylindrical recess 132 is formed in the housing 40 to receive a lower end portion of the guide wall 128. The longitudinally extending leg 80 of the piston 48 and the leg 93 of the piston 50 engage opposite sides of the guide wall 128. The guide wall 130 is positioned coaxially with the control shaft 34 in abutting relationship with an upper surface of the yoke lever 56. The guide wall 130 is received in a cylindrical recess 134 in the bearing cap 64. The longitudinally extending leg 78 of the piston 48 and the longitudinally extending leg 95 of the piston 50 engage opposite sides of the cylindrical guide wall 130. When the pistons 48 and 50 are moved relative to each other in the chamber 46, frictional engagement between the longitudinally extending legs 78, 80, 93 and 95 will cause the two guide walls 128 and 130 to rotate relative to the side wall 120 of the chamber 46. Since the yoke lever 56 and shaft 34 are also rotated relative to the wall 120 of the chamber 46 by movement of the pistons 48 and 50, the guide walls 128 and 130 do not normally rotate relative to the control shaft 34 and yoke lever 56.

In addition to maintaining the side walls 76 and 90 of the pistons 48 and 50 in sliding engagement with the cylindrical wall 120 of the chamber 46, the guide walls 128 and 130 act as bearings to resist inward forces, exerted by the side walls 77 and 90, when the pistons are moved in the chamber 46. As will be seen from an inspection of FIG. 3, the guide walls 128 and 130 have a larger diameter than the outer diameter of the control shaft 34 so that the guide walls are not in direct engagement with the control shaft 34. Therefore, the guide walls 128 and 130 resist the side thrust forces exerted by the side walls 77 and 90 of the pistons 48 and 50 without transmitting these forces to the control shaft 34. This feature is particularly advantageous, since it prolongs the life of both the valve actuator 12 and the valve 10 by preventing the control shaft 34 from being cocked or tilted sideways due to the side thrust forces exerted by the pistons 48 and 50. Although the guide walls 128 and 130 have been shown, in the preferred embodiment, as being separate from the housing 40, it will be apparent to those skilled in the art that the guide walls 128 and 130 could be integrally formed with the housing 40 and extend longitudinally of the chamber 46. However, if the side walls were formed in this manner they would not rotate, relative to the housing 40, when the pistons were moved in the chamber 46 and there would be a resulting friction force between the relatively fixed guide walls and the legs 78, 80, 93 and 95 of the pistons 48 and 50.

Referring now to FIG. 5, taken in conjunction with FIGS. 2 and 3, a schematic drawing of the control system 140 for operating the valve actuator 12 is shown. The control system 140 includes a four-way reversing valve 142, of known construction, which is actuated by a solenoid 144 to connect a conduit 146, from a source of fluid under pressure, to one of a pair of conduits 148 and 150 which lead to the valve actuator 12. An exhaust outlet 152 is also connected to the valve 142. When the four-way reversing valve is operated, by energizing the solenoid 144, high pressure fluid from the inlet conduit 146 is directed into the conduit 148 which leads to the valve actuator 12. At the same time the conduit 150 is connected to the conduit 152 to exhaust fluid from the valve actuator 12. When the valve is shifted, by means of the solenoid 144, the conduit 150 is connected to the conduit 146 to conduct high pressure fluid to the valve actuator 12. Simultaneously, the conduit 148 is connected to the conduit 152 to exhaust fluid from the valve actuator 12.

As is perhaps best seen in FIG. 3, the conduit 148 is connected to a manifold ring 158 in the housing 40 by a passage 160. The manifold ring 158, which extends completely around the cylindrical chamber 46, provides an even distribution of high pressure fluid from the conduit 148 against the inner surfaces 114 and 116 of the pistons 48 and 50. Also, piston seals 161 are provided in the head portions 74 and 76 of the pistons. Thus, the high pressure fluid acting against the inner surfaces 114 and 116 of the pistons 48 and 50 causes the pistons to move outwardly, from the position shown in FIG. 2 to the position shown in FIG. 1. Similarly, when the pistons 48 and 50 are moved from the position shown in FIG. 1 to the position shown in FIG. 2, the manifold ring 158 permits fluid located between the pistons to flow out of the chamber 46 through the conduit 148 to the exhaust conduit 152.

Referring now to FIG. 3, taken in conjunction with FIG. 2, the conduit 150 is connected to a longitudinally extending passage 164 which has ports 166 and 168 at opposite ends of the cylindrical chamber 46. The ports 166 and 168 are connected to annular manifold rings 170 and 172 which are formed in the cylinder heads or caps 42 and 44. The longitudinally extending passage 164 and the manifold rings 170 and 172 enable high pressure fluid to flow from the conduit 150 to opposite end portions of the chamber 46. The high pressure fluid engages the outer surfaces 70 and 72 of the pistons 48 and 50 to force them inwardly from the position shown in FIG. 1 to the position shown in FIG. 2. In a similar manner, when the pistons 48 and 50 are moved from the position shown in FIG. 2 to the position shown in FIG. 1, the manifold rings 170 and 172 and longitudinally extending passages 164 enable fluid located between the surface 170 and 172 of the pistons and the cylinder heads or caps 42 and 44 to flow out of the chamber 46 through the conduit 150.

For purposes of affording a more complete understanding of the invention, it is advantageous now to provide a functional description of the mode in which the component parts operate. The valve 10 is rotated from the open position shown in FIG. 1 to a closed position by rotating the valve ball 24 in the valve chamber 20. This rotation is achieved by means of a valve actuator 12. When the valve 10 is to be closed, the solenoid 144 is actuated to conduct high pressure fluid through the conduit 150 and passage 164 to opposite ends of the chamber 46. The high pressure fluid will press against the outer surfaces 70 and 72 of the pistons 48 and 50 to move them inwardly, from the position shown in FIG. 1 to that of FIG. 2. Contemporaneously with the conducting of high pressure fluid to the outer ends of the chamber 46, the conduit 148 will be connected to the conduit 152 to exhaust fluid located between the pistons 150 to the atmosphere or a suitable reservoir. Thus, the pistons 48 and 50 will be freely movable from the outer position shown in FIG. 1 to the inner position shown in FIG. 2. This initial movement of the pistons from the outer position to the inner position causes the roller pin assemblies 84 and 98 to exert a force on the side surfaces of the U-shaped slots 94 and on the yoke lever 56 to rotate the control shaft 34 and the valve ball 24.

In FIG. 6 a force diagram, illustrating the force applied by the pin assembly 96 on the yoke 56 is shown. The pin assembly 96 will exert an effective force E which is equal to the fluid pressure P times the area A of the outer surface 72 of the piston less the break-away or friction force B exerted by the piston seals on the sidewall 120 of the chamber 46. This effective force will be resolved into two force components by the pin assembly 96. The first force component X will be exerted perpendicularly to a longitudinally extending axis of the yoke lever 56. A second force component of side thrust Y will be exerted against the guide walls 128 and 130.

As previously mentioned, the force component X acts perpendicularly to the longitudinal axis of the yoke lever 56. This perpendicular force will (see FIG. 7) be larger than the inital effective force E which is applied to the pin assembly 96. The relatively large force component X is the result of the advantageous combination of the pin assembly 96 and the slot 98 in the yoke lever 56. The roller 102 of the pin assembly 96 can exert only a force perpendicular to the longitudinal axis of the yoke 56. Any side thrust component of force which might tend to be exerted by the roller 102 will result in a rolling movement of the roller relative to the yoke lever 56. Therefore, the effective force component E must, of necessity, be resolved into a component X which is perpendicular to the longitudinal axis of the yoke lever and a thrust component Y which is perpendicular to the guide walls 128 and 130. The force parallelogram, as shown in FIG. 7, results in the force X being larger than the effective force E when the piston 50 is initially displaced by fluid pressure.

As the pistons 48 and 50 move inwardly toward each other, the force component X will gradually diminish in size until, when the longitudinal axis of the yoke 56 is perpendicular to the longitudinal axis of the chamber 46, the force X will be exerted in a direction parallel to the force E and, consequently, will be of the same magnitude as the force E. As the yoke assembly is rotated still further, the force X will again gradually increase in size as the angle of displacement of the longitudinal axis of the yoke lever 56 relative to the transverse axis of the chamber 48 is increased. In a similar manner, when high pressure fluid is conducted through the conduit 148 against the interior surfaces of the pistons 114 and 116, to move the pistons from the position shown in FIG. 2 to the position shown in FIG. 1, the initial force component X will be relatively large and diminish in size as the yoke lever 56 is pivoted toward a position wherein the longitudinal axis of the yoke lever is coincident with the transverse axis of the chamber 46. When the longitudinal axis of the yoke lever 56 is coincident with the transverse axis of the chamber 46, the force component X will be parallel to and equal to the effective force component E. As the yoke lever is rotated still further relative to the chamber 46, the force component X will gradually increase.

As is seen in FIGS. 2 and 6, it is the force component X acting perpendicularly to the yoke plate 56 or lever arm $L_1$ which exerts a rotational torque on the control shaft 34. Thus, as indicated in FIG. 6, the rotational torque is equal to the force component X times $L_1$. Since the force component X has a relatively large initial value, the torque exerted on the control shaft 34 by the yoke lever 56 will have a relatively large initial value. As the control shaft 34 is rotated, the force component X and the effective lever arm $L_1$ will gradually decrease and result in a lower torque, as shown by the graph in FIG. 8 for an exemplary valve actuator, being exerted on the control shaft 34 until, when the longitudinal axis of the yoke lever 56 is coincident with the transverse axis of the chamber 48 (or zero degrees rotation in FIG. 8) the torque will reach a minimum amount. As the yoke lever 56 is rotated further, the force component X and the effective lever arm $L_1$ will gradually increase. Therefore, as shown in FIG. 8, the torque on the control shaft will increase after the yoke lever 56 is rotated from the position with its longitudinal axis extending transversely to the chamber 46. Of course, the total torque exerted by the two pistons 48 and 50 will as indicated in FIGS. 6 and 8, be twice the torque exerted by one piston.

In view of the foregoing remarks, it will be apparent that by providing pin assemblies 84 and 98 mounted on the pistons 48 and 50, a relatively large initial torque is exerted on the control shaft 34 to break the seal between the flow control ball 24 and the valve seats 26 and 28. This relatively large initial torque is decreased as the pistons are moved toward each other. The valve ball will, however, continue to turn since once the initial turning movement of the valve ball is started and the seals between the ball and the valve seats broken, the torque required to continue the rotation will be substantially less than the torque required for the initial rotational movement of the valve ball. The side thrust component Y is resisted by the guide walls 128 and 130 and, since the guide walls are not in direct contact with the control shaft 34, does not result in a bending force being exerted on the control shaft and transmitted to the valve 10 by the control shaft.

The specific example herein shown and described is illustrative only. Various changes in structure will, no doubt, occur to those skilled in the art; and such changes are to be understood as forming a part of this invention insofar as they fall within the spirit and scope of the appended claims.

What is claimed is:

1. A valve actuator assembly comprising: housing means for mounting on a valve mechanism; control shaft means extending outwardly from said housing means for actuating a valve mechanism, said control shaft means having a longitudinal axis intersecting a longitudinal axis of said housing means; lever means located within said housing means and connected to said control shaft means; cylindrically shaped guide wall means located in said housing means adjacent to said control shaft; first and second piston means mounted for reciprocating movement along the longitudinal axis of said housing means; first pin means secured to said first piston means for sliding engagement with a first end portion of said lever means; and second pin means secured to said second piston means for sliding engagement with the second end portion of said lever means; said first piston means having a first longitudinally extending side wall means located on a first side of said control shaft means in sliding engagement with said guide wall means; and said second piston means having a second longitudinally extending side wall located down a second side of said control shaft means in sliding engagement with said guide wall means, whereby said guide wall means is rotated relative to said housing means by the reciprocating movement of said piston means.

2. A valve actuator assembly comprising: housing means for mounting on a valve mechanism; control shaft means extending outwardly from said housing means for actuating a valve mechanism, said control shaft means having a longitudinal axis intersecting a longitudinal axis of said housing means; level means located within said housing means and connected to said control shaft means; first and second piston means mounted for reciprocating movement along the longitudinal axis of said housing means; said first and second piston means each having a head portion and side wall portion including a pair of spaced apart longitudinally extending leg sections, said leg sections being in sliding contact with an inner wall of said housing means; first pin means secured to said first piston means for sliding engagement with a first end of said lever means, said first pin means extending between the leg sections of said first piston means, and the first end portion of said lever means extending between the leg sections of said first piston means to engage said first pin means; second pin means secured to said second piston means for sliding engagement with a second end portion of said lever means, said second pin means extending between the leg sections of said second piston means and a second end portion of said lever means extending between the leg sections of said second piston means to engage said second pin means, said first and second piston means being movable to rotate said control shaft means; and an outermost end portion of said leg sections being tapered inwardly away from the wall of said housing means to enable the leg sections of said first piston means to engage the head portion of said second piston means at an area spaced from the inner wall of said housing means, and to enable the leg sections of said second piston means to engage the head portion of said first piston means at an area spaced from the inner wall of said housing means.

3. A valve actuator assembly comprising: housing means for mounting on a valve, said housing means defining a cylindrical longitudinally extending chamber means; a control shaft mounted in said housing means and extending through said chamber means; first and second piston means mounted for sliding movement in said chamber means, said first piston means having a first head portion extending transversely of said chamber means and a first side wall portion extending longitudinally of said chamber means in sliding contact with said housing means on a first side of said control shaft, said second piston means having a second head portion extending transversely of said chamber means and a second side wall portion extending longitudinally of said chamber means in sliding contact with said housing means on a second side of said control shaft; guide wall means positioned between said first and second side walls to hold said first and second side walls in sliding engagement with said housing means, said guide wall means being cylindrical in shape and mounted coaxially with said control shaft and spaced apart from said control shaft; a first pin means mounted on said first side wall; second pin means mounted on said second side wall; and a lever means secured to said control shaft, said lever means having a first slot in a first end portion for engaging said first pin means and a second slot in a second end portion for engaging said second pin means, wherein movement of said first and second piston means relative to said housing means rotates said lever means and said control shaft relative to said housing means.

4. An assembly as set forth in claim 3 wherein: said guide means includes a first cylindrical wall member mounted coaxially with said control shaft and spaced apart from said control shaft, said first cylindrical wall member being positioned below said lever means; and said guide wall means further includes a second cylindrical wall member mounted coaxially with and spaced apart from said control shaft, said second cylindrical wall member being positioned above said lever means.

5. An assembly as set forth in claim 4 wherein: said first and said second cylindrical wall members are rotated relative to said housing means by longitudinal movement of said first and said second piston means in said chamber means.

References Cited

UNITED STATES PATENTS

| | | | |
|---|---|---|---|
| 955,896 | 4/1910 | Morrison | 91—186 X |
| 2,551,916 | 5/1951 | Sittert et al. | 92—140 X |
| 2,848,056 | 8/1958 | Herbenar | 91—186 X |
| 3,104,592 | 9/1963 | Sheesley | 92—140 X |
| 3,107,080 | 10/1963 | Priese | 251—58 X |
| 3,253,518 | 5/1966 | Duemler | 92—68 |
| 3,298,286 | 1/1967 | Tyler | 92—140 |

MARTIN P. SCHWADRON, *Primary Examiner.*

I. C. COHEN, *Assistant Examiner.*

UNITED STATES PATENT OFFICE
CERTIFICATE OF CORRECTION

Patent No. 3,394,632　　　　　　　　　　　　　　　　　July 30, 1968

Werner K. Priese

It is certified that error appears in the above identified patent and that said Letters Patent are hereby corrected as shown below:

Column 1, line 43, "value" should read -- valve --. Column 3, line 14, "loke" should read -- yoke --; line 24, "operates" should read -- operate --. Column 5, line 52, "of side" should read -- or side --. Column 7, line 28, "level" should read -- lever --.

Signed and sealed this 6th day of January 1970.

(SEAL)
Attest:

Edward M. Fletcher, Jr.　　　　　　　　　　WILLIAM E. SCHUYLER, JR.
Attesting Officer　　　　　　　　　　　　　　　Commissioner of Patents